US007651966B2

(12) United States Patent
Brow et al.

(10) Patent No.: US 7,651,966 B2
(45) Date of Patent: Jan. 26, 2010

(54) ALKALINE RESISTANT PHOSPHATE GLASSES AND METHOD OF PREPARATION AND USE THEREOF (75) Inventors: Richard K. Brow, Rolla, MO (US); Signo T. Reis, Rolla, MO (US); Mariano Velez, Rolla, MO (US); Delbert E. Day, Rolla, MO (US)

(73) Assignees: Mo-Sci Corporation, Rolla, MO (US); The Curators of the University of Missouri, Columbia, MO (US)

( * ) Notice: Subject to any disclaimer, the term of this patent is extended or adjusted under 35 U.S.C. 154(b) by 161 days.

(21) Appl. No.: 11/693,863

(22) Filed: Mar. 30, 2007

(65) Prior Publication Data

US 2007/0243991 A1    Oct. 18, 2007

Related U.S. Application Data (60) Provisional application No. 60/745,036, filed on Apr. 18, 2006.

(51) Int. Cl.
C03C 3/16    (2006.01)
C03C 13/00   (2006.01)
C04B 14/42   (2006.01)

(52) U.S. Cl. .............................. 501/45; 501/46; 501/47; 501/48; 501/35; 106/711; 588/11; 588/12

(58) Field of Classification Search ............. 504/45–48, 504/73, 77–79; 588/11, 12; 501/45–48, 501/73, 77–79, 35; 106/711
See application file for complete search history.

(56) References Cited

U.S. PATENT DOCUMENTS

| 3,969,121 A | 7/1976 | Atkinson |
| 4,008,094 A | 2/1977 | Beall et al. |
| 4,140,533 A | 2/1979 | Ohtomo et al. |
| 4,272,294 A | 6/1981 | Jaunarajs |
| 4,345,037 A | 8/1982 | Fyles et al. |
| 4,360,625 A | 11/1982 | Griffith |
| 4,604,097 A | 8/1986 | Graves, Jr. et al. |
| 4,613,577 A * | 9/1986 | Tagai et al. .................. 501/35 |

(Continued)

FOREIGN PATENT DOCUMENTS

WO    9207801    * 5/1992

(Continued)

OTHER PUBLICATIONS

Innovation by Design: Glass Fiber Reinforced Concrete Cladding; Publication GFRC-3-01 of the Precast/Prestressed Concrete Institute, 1993; www.pci.org.

(Continued)

*Primary Examiner*—Karl E Group
(74) *Attorney, Agent, or Firm*—Tristan A. Fuierer; Moore & Van Allen, PLLC (57) ABSTRACT A substantially alkaline resistant calcium-iron-phosphate (CFP) glass and methods of making and using thereof. In one application, the CFP glass is drawn into a fiber and dispersed in cement to produce glass fiber reinforced concrete (GFRC) articles having the high compressive strength of concrete with the high impact, flexural and tensile strength associated with glass fibers.

30 Claims, 5 Drawing Sheets

U.S. PATENT DOCUMENTS

| | | | |
|---|---|---|---|
| 4,617,279 | A | 10/1986 | Manabe et al. |
| 4,681,633 | A | 7/1987 | Watanabe et al. |
| 4,693,748 | A | 9/1987 | Kobayashi et al. |
| 4,735,857 | A | 4/1988 | Tagai et al. |
| 4,820,573 | A | 4/1989 | Tagai et al. |
| 4,835,122 | A | 5/1989 | Chopinet |
| 4,847,008 | A | 7/1989 | Boatner et al. |
| 4,882,302 | A | 11/1989 | Horiuchi et al. |
| 5,013,323 | A | 5/1991 | Kobayashi et al. |
| 5,215,563 | A | 6/1993 | LaCourse et al. |
| 5,236,495 | A | 8/1993 | Manabe et al. |
| 5,750,824 | A | 5/1998 | Day |
| 5,810,921 | A | 9/1998 | Baxter et al. |
| 5,840,638 | A | 11/1998 | Cao et al. |
| 5,874,509 | A | 2/1999 | Shalaby et al. |
| 5,880,045 | A | 3/1999 | Cao et al. |
| 5,960,368 | A | 9/1999 | Pierce et al. |
| 6,555,491 | B1 * | 4/2003 | Healy ............................ 501/35 |
| 6,767,854 | B2 | 7/2004 | Berger et al. |
| 6,836,356 | B2 * | 12/2004 | Jiang et al. ................ 359/341.5 |
| 2002/0119179 | A1 | 8/2002 | Rezania et al. |
| 2003/0198660 | A1 | 10/2003 | Janas et al. |
| 2005/0233888 | A1 * | 10/2005 | Seneschal et al. ............. 501/45 |
| 2006/0172877 | A1 * | 8/2006 | Fechner et al. ................. 501/48 |

FOREIGN PATENT DOCUMENTS

WO          2004076371     *    9/2004

OTHER PUBLICATIONS

B.A. Proctor, D.R. Oakley, K.L. Litherland, "Developments in the Assessment and Performance of GRC over 10 Years," Composites, 13[2] 173-179 (1982).

M.S. Stucke, A.J. Majumdar, "Microstructure of Glass Fiber-Reinforced Cement Composite," J. Mater. Sci., 11, 1019-1030 (1976).

A.J. Majumdar, R.W. Nurse, Glass Fiber Reinforced Cement, Mat. Sci. Eng., 15, 107-127 (1974).

A.J. Majumdar, J.F. Ryder, Glass Fiber Reinforcement of Cement Products, Glass Technol., 9[3], 78-84, (1968).

C.D. Johnston, Glass Fiber-Reinforced Cements and Concretes, Chapter 6, edited by V.M. Malhotra, Gordon & Breach Science Publishers, 2001.

Proceedings Durability of Glass Fiber Reinforced Concrete Symposium, Nov. 12-15, 1985; Prestressed Concrete Institute, Chicago.

A. Bentur, M. Ben-Bassat, D. Schneider, Durability of Glass-Fiber-Reinforced Cements with Different Alkali-Resistant Glass Fibers, J. Am. Ceram. Soc., 68[4] 203-208 (1985).

L.J. Larner, K. Speakman, A.J. Majumdar, Chemical Interactions between Glass Fibers and Cement, J. Non-Cryst. Solids, 20, 43-74 (1976).

R.K. Brow, The Structure of Simple Phosphate Glasses, J. Non-Cyst. Solids, 263 & 264, 1-28 (2000).

M.G. Mesko, D.E. Day, Immobilization of Spent Nuclear Fuel in Iron Phosphate Glass, J. Nuclear Mat., 273, 27-36 (1999).

D.E. Day, Z. Wu, C.S. Ray, P. Hrma, Chemically Durable Iron Phosphate Glass Wasteforms, J. Non-Cryst. Solids, 241, 1-12 (1998).

S.T. Reis, M. Karabulut, D.E. Day, Chemical Durability and Structure of Zinc-Iron Phosphate Glasses, J. Non-Cryst. Solids, 292, 150-157 (2001).

M. Karabulut, E. Melnik, R. Stefan, G.K. Marasinghe, C.S. Ray, C.R. Kurkjian, D.E. Day, Mechanical and Structural Properties of Phosphate Glasses, J. Non-Cryst. Solids, 288, 8-17 (2001).

X. Fang, C.S. Ray, A. Mogus-Milankovic, D.E. Day, Iron Redox Equilibrium, Structure and Properties of Iron Phosphate Glasses, J. Non-Cryst. Solids, 283, 162-172 (2001).

G.K. Marasinghe, M. Karabulut, C.S. Ray, D.E. Day, M.G. Shumsky, W.B. Yelon, C.H. Booth, P.G. Allen, D.K. Shuh, Structural Features of Iron Phosphate Glasses, J. Non-Cryst. Solids, 222, 144-152 (1997).

B.C. Sales, M.M. Abraham, Structural Properties of Lead-Iron Phosphate Glasses, J. Non-Cryst. Solids, 71, 103-112 (1985).

T.M. Neidt, Recycling of Industrial Phosphate Waste as Raw Material for Innovative Iron Phosphate Glass Fibers, Mo-Sci Corp. Final Report Phase I SBIR Contract No. 68-D-03-030, U.S. Environmental Protection Agency, Sep. 30, 2003.

T.P. Seward, High Temperature Glass Melt Property Database for Modeling, Technical/Scientific Report DE-FG07—96EE41262, Mar. 31, 2003; pp. 64; http://www.eere.energy.gov/industry/glass/pdfs/cgr_database.pdf.

Cem-FIL® GRC Technical Data, Saint-Gobain/Vetrotex, http://www.cem-fil.com/pdf/complete%20Manual2.pdf.

G.K. Marasinghe, M. Karabulut, C.S. Ray, D.E. Day, Properties and Structure of Vitrified Iron Phosphate Nuclear Wasteforms, J. Non-Cryst. Solids, 263 & 264, 146-154 (2000).

G.K. Marasinghe, M. Karabulut, X. Fang, C.S. Ray, D.E. Day, Iron Phosphate Glasses: An Alternative to Borosilicate Glasses for Vitrifying Certain Nuclear Wastes, Environmental Issues and Waste Management Technologies VI, pp. 361-368.

D. Zhu, C-W Kim, D.E. Day, Corrosion Behavior of Iconel 690 and 693 in an Iron Phosphate Melt, Journal of Nuclear Materials, 336 (2005) pp. 47-53.

S.T. Reis, M.H. Valez, R.K. Brow, (AM-CEM-37-2005) Alkaline-Resistant Iron-Phosphate (ARFP) Glass Fibers for Concrete Reinforcement, CE-Poster Session, The American Chemical Society 107th Annual Meeting Abstract Book, pp. 236.

* cited by examiner

ALKALINE RESISTANT PHOSPHATE GLASSES AND METHOD OF PREPARATION AND USE THEREOF

CROSS REFERENCE TO RELATED APPLICATIONS

This is a non-provisional application claiming priority to U.S. Provisional Patent Application No. 60/745,036 for "Alkaline Resistant Phosphate Glasses and Method of Preparation and Use Thereof" filed on Apr. 18, 2006, in the name of Richard K. Brow et al., which is incorporated herein in its entirety.

GOVERNMENT RIGHTS IN THE INVENTION

The United States Government has rights to this invention pursuant to U.S. Department of Energy contract number DE-FC36-04GO14046.

FIELD OF THE INVENTION

The present invention relates to novel alkaline resistant calcium-iron-phosphate glass compositions and methods of making and using same in applications requiring superior mechanical properties and chemical durability.

DESCRIPTION OF THE RELATED ART

Glass Fiber Reinforced Concrete (GFRC) is a Portland cement-based composite with alkaline resistant (AR) glass fibers that are uniformly dispersed throughout the product [1-5]. GFRC composites combine the high compressive strength of cement with the high impact, flexural and tensile strength of AR fibers and as such, are often used in non-structural architectural cladding panels, wallboards, facades, tiles and other applications where relatively thin cross-sections and low component weights are needed.

Disadvantageously, the high pH liquids in concrete formed by the reaction of the cement with water chemically react with some glasses which causes expansion and cracking of the concrete [6]. Accordingly, the glass fibers used to reinforce GFRC composites must possess outstanding chemical resistance to the high pH liquid environment. In addition, further desired properties of said glass fibers include melt viscosity-temperature and surface tension-temperature characteristics suitable for fiber drawing, and physical properties (elastic modulus, density) that are similar to the high zirconia (10-20 wt. %) silicate glasses that are presently used in said composites.

The zirconia-silica-based glasses presently used in the art must be processed at high temperatures (~1400-1600° C.) because of the refractory nature of zirconia, and degrade and become weak in about six months in the cement product due in part to the highly alkaline (pH ~13) liquids in the product chemically attacking the glass fibers as well as fiber bundle embrittlement due to the formation of calcium hydroxide crystals during cement hydration [7-10].

Accordingly, various glass compositions have been suggested as zirconia-silica-based glass replacements. Certain phosphate glasses are known for their chemical durability in neutral and acidic environments and low processing temperatures due to their molecular structures [11]. For example, iron-phosphate glasses have a high chemical durability, which has made them useful for nuclear waste encapsulation [12-14]. Typically, the iron phosphate encapsulation compositions contain 30 to 70 wt. % $P_2O_5$, 25 to 50 wt. % $Fe_2O_3$, and smaller amounts of other oxides. A high proportion of the iron in the encapsulation composition is present as $Fe^{3+}$ and provides a higher chemical resistance to chemical attack [15-18]. Advantageously, iron-phosphate glasses require a significantly lower processing temperature (~900-1200° C.) and as such, offer the potential for saving 40-60% of the energy required to manufacture the zirconia-silica-based glasses. Disadvantageously, it is difficult to draw fibers from iron phosphate melts and the iron phosphate glasses developed to date do not possess the requisite chemical durability in alkaline environments. For example, iron phosphate glasses having a pyrophosphate structure are at least two times less stable in an alkaline environment than in an acidic or neutral environment [19].

It would be a significant advance in the art to provide novel iron-phosphate glasses that are substantially alkaline resistant and have viscosity-temperature curves which indicate that they are well suited for forming fibers. Of particular interest are calcium-iron-phosphate (CFP) glass compositions, because such CFP glasses show promising chemical durability in high pH environments, have comparable physical properties, and have processing temperatures that are much lower relative to other AR glasses known in the art.

SUMMARY OF THE INVENTION

The present invention generally relates to novel calcium-iron-phosphate (CFP) glass compositions and processes for making and using said CFP glasses in GFRC composites. The CFP glass compositions are produced by combining CaO, $P_2O_5$, optionally $Fe_2O_3$, optionally a fluoride source such as $CaF_2$, and optionally at least one additional metal oxide species to form a homogeneous mixture and then melting said mixture at temperature in a range from about 900° C. to about 1200° C. Preferably, the CFP glass compositions include at least one rare earth oxide species (e.g., $La_2O_3$, $CeO_2$, $Y_2O_3$). Advantageously, the CFP glass compositions require a lower processing temperature than that required to manufacture zirconia-silica-based glasses known in the art (~1400-1600° C.). Following fiberization of the glass melt compositions of the invention, the CFP glass fibers have utility in a number of applications including, but not limited to, dispersal in glass fiber reinforced concrete.

In one aspect, the present invention relates to a phosphate glass composition having an atomic ratio of Ca/P of about 0.04 to about 0.50, an atomic ratio of O/P of about 3.10 to about 3.55 and an atomic ratio of Fe/P of about 0 to about 0.42.

In another aspect, the present invention relates to a method of making a calcium-iron-phosphate (CFP) glass, said method comprising:

combining and mixing at least one calcium species, a phosphate species, and optionally an iron species, to form a homogeneous CFP mixture;

melting said CFP mixture to form a CFP glass composition, wherein an atomic ratio of Ca/P in the CFP glass composition is about 0.04 to about 0.50, an atomic ratio of O/P in the CFP glass composition is about 3.10 to about 3.55, and an atomic ratio of Fe/P in the CFP glass composition is about 0 to about 0.42.

In yet another aspect, the present invention relates to a glass fiber reinforced concrete (GFRC) composition comprising calcium-iron-phosphate (CFP) glass and cement, wherein the CFP glass has an atomic ratio of Ca/P of about 0.04 to about 0.50, an atomic ratio of O/P of about 3.10 to about 3.55 and an atomic ratio of Fe/P of about 0 to about 0.42.

Another aspect of the present invention relates to a polymeric composition comprising calcium-iron-phosphate (CFP) glass and a polymer, wherein the CFP glass has an atomic ratio of Ca/P of about 0.04 to about 0.50, an atomic ratio of O/P of about 3.10 to about 3.55 and an atomic ratio of Fe/P of about 0 to about 0.42.

In still another aspect, the present invention relates to a phosphate glass composition having an atomic ratio of Ca/P of about 0.04 to about 0.50, an atomic ratio of O/P of about 3.10 to about 3.55 and an atomic ratio of Fe/P of about 0 to about 0.42.

A still further aspect of the invention relates to a phosphate glass composition having an atomic ratio of Ca/P of about 0.04 to about 0.50, an atomic ratio of O/P of about 3.10 to about 3.55 and an atomic ratio of Fe/P of about 0 to about 0.42, wherein the phosphate glass composition includes at least one rare earth oxide species selected from the group consisting of $Y_2O_3$, $La_2O_3$, $CeO_2$, and combinations thereof.

Another aspect of the present invention relates to a phosphate glass composition having an atomic ratio of Ca/P of about 0.04 to about 0.50, an atomic ratio of O/P of about 3.10 to about 3.55 and an atomic ratio of Fe/P of about 0 to about 0.42, wherein the phosphate glass composition includes at least one rare earth oxide species selected from the group consisting of $Y_2O_3$, $La_2O_3$, $CeO_2$, and combinations thereof, and wherein said composition includes less than about 10 wt. % $SiO_2$.

Yet another aspect of the present invention relates to a method for containment of hazardous waste in a rigid waste form comprising:

heating a batch mixture comprising said waste and a matrix-forming component at a temperature not in excess of about 1200° C. to form a melt; and cooling said melt to form said rigid waste form having said metal waste chemically dissolved therein, said batch mixture having a composition having an atomic ratio of Ca/P of about 0.04 to about 0.50, an atomic ratio of O/P of about 3.10 to about 3.55 and an atomic ratio of Fe/P of about 0 to about 0.42.

Other aspects, features and advantages of the invention will be more fully apparent from the ensuing disclosure and appended claims.

DETAILED DESCRIPTION OF THE INVENTION, AND PREFERRED EMBODIMENTS THEREOF

The present invention relates generally to substantially alkaline resistant calcium-iron-phosphate (CFP) glass compositions. More specifically, the present invention relates to substantially alkaline resistant CFP glasses to replace the silicate glasses that are currently used in glass fiber-reinforced concrete (GFRC) articles.

The present disclosure describes new glass compositions, based generally on the calcium-iron-phosphate system, that possess chemical durabilities and physical properties that are comparable to the commercial zirconia-silica-based AR glasses. Advantageously, the Ca—Fe-phosphate glasses may be processed into fibers at lower temperatures than the zirconia-silica-based AR glasses, thereby producing significant energy savings.

More specifically, the novel substantially alkaline resistant CFP glasses of the present invention are based on glasses from the $CaO$—$Fe_2O_3$—$P_2O_5$ system, modified with a variety of different oxides and fluorides such as $MgF_2$, $CaF_2$, $BaF_2$, $SrF_2$, and $AlF_3$. The CFP glasses may be produced from conventional raw materials that are melted in commercial refractory crucibles in air, generally from two to four hours, at temperatures in the range 900-1200° C., compared with 1500° C. to 1600° C. for E-glass and Cem-FIL®. As a result of the lower processing temperatures, the CFP fibers may be drawn from platinum-free bushings or platinum alloy-based bushings at relatively low temperatures, i.e., below 1200° C.

Further advantages associated with the novel CFP fibers described herein include, but are not limited to, the extended life of glass-contact refractories, extended furnace life, the ability to use commercially available, non-expensive, alumino-silicate refractories, lower gas emissions such as $SO_x$ and greenhouse gases ($NO_x$, and $CO_2$), less refractory waste, fewer stones and defects in the glass, an extended life of the Pt alloy-based bushings, and a reduction of the need for expensive and scarce zirconia. In addition, phosphates produced in other waste-generating streams, for example the corrosion treatment of iron metals and fluorescent bulb recycling, may be used as the raw material for the manufacture of the CFP glasses.

As defined herein, "substantially alkaline resistant" and "substantially resistant" describes materials that undergo negligible degradation in the presence of compositions or composites having a pH of greater than about 10. "Negligible degradation" as defined herein corresponds to dissolution rates less than $1\times10^{-7}$ g $cm^{-2}$ $min^{-1}$ at 80° C. in the presence of the alkaline composition or composite, more preferably dissolution rates less than $1\times10^{-8}$ g $cm^{-2}$ $min^{-1}$ dissolution, even more preferably less than $1\times10^{-9}$ g $cm^{-2}$ $min^{-1}$, and most preferably less than $1\times10^{-10}$ g $cm^{-2}$ $min^{-1}$. Put another way, substantially alkaline resistant corresponds to materials that will not readily degrade, in the presence of compositions or composites having a pH of greater than 10.

As defined herein, "phosphate" describes all polyatomic species (ionic and non-ionic) comprising both phosphorus and oxygen including, but not limited to: phosphate ($PO_4^{3-}$); hydrogen phosphate ($HPO_4^{2-}$); dihydrogen phosphate ($H_2PO_4^-$); phosphorus pentaoxide ($P_2O_5$); polyphosphates such as pyrophosphate ($P_2O_7^{4-}$) and triphosphate ($P_3O_{10}^{5-}$); and ring or chain metaphosphates ($P_nO_{(3n)}^{n-}$, where n=1-6).

For ease of reference, as defined herein, "CFP" glass, which typically includes calcium, iron and phosphorus ions may also be used to describe novel glasses produced which include calcium and phosphorus but which may be substantially devoid of iron. As defined herein, "substantially devoid" is defined herein as less than 2 wt. %, preferably less than 1 wt. %, more preferably less than 0.5 wt. %, and most preferably less than 0.1 wt. %.

As defined herein, "phosphating waste" refers to phosphate waste sludge from iron and zinc conversion coating processes in the automobile, appliances, heavy equipment, and related industries. The composition range of said phosphating waste typically is, in weight %, $P_2O_5$: 29 to 48, $Fe_2O_3$: 4 to 49, CaO: 0.3 to 31, ZnO: 1 to 15, MgO: 0 to 6, NiO: 0, MnO: 0 to 4, $Cr_2O_3$: 0 to 2, $Al_2O_3$: 0 to 6, $SiO_2$: 0 to 4, $Na_2O$: 0 to 12, $K_2O$: 0 to 5, and $TiO_2$: 0 to 1.5 [20].

As defined herein, "fluorescent bulb waste" refers to a recycled Ca-phosphate powder obtained from discarded fluorescent lamps. The composition range of said fluorescent bulb waste typically is, in weight %, $P_2O_5$: 18 to 24, $Fe_2O_3$: 0.2 to 0.7, CaO: 28 to 42, MgO: 0.8 to 1.5, MnO: 0.6 to 1, $Cr_2O_3$: 0, $Al_2O_3$: 3 to 6, $SiO_2$: 15 to 31, $Na_2O$: 3 to 6, $K_2O$: 0.2 to 0.3, $TiO_2$: 0, SrO: 0.6 to 1.4, BaO: 0.2 to 0.3, PbO: 0, $Y_2O_3$: 2 to 8, $La_2O_3$: 0.3 to 0.9, $CeO_2$: 0.3 to 0.8, and $Sb_2O_3$: 0 to 0.3.

Compositions of the invention may be embodied in a wide variety of specific formulations, as hereinafter more fully described.

In all such compositions, wherein specific components of the composition are discussed in reference to mole percentage ranges including a zero lower limit, it will be understood that such components may be present or absent in various specific embodiments of the composition, and that in instances where such components are present, they may be present at concentrations as low as 0.01 mole percent, based on the total mole of the composition in which such components are employed.

In one aspect, the present invention relates to CFP glass compositions made by combining and mixing at least one calcium source, at least one phosphate source, and optionally at least one iron source, and melting said mixture to form the CFP glass composition, wherein the glass composition has the following range of ratios:

| component | mole % ratio range |
|---|---|
| Ca/P | about 0.04 to about 0.50 |
| Fe/P | 0 to about 0.42 |
| O/P | about 3.10 to about 3.55 |

Two general compositional phosphate classifications are preferred—polyphosphate compositions having an O/P ratio of about 3.1 to about 3.4 and pyrophosphate compositions having an O/P ratio of 3.4-3.6, whereby the larger the O/P ratio, the shorter the average phosphate anion chains in the phosphate glass structure [11].

In the broad practice of the invention, the CFP glass composition may comprise, consist of, or consist essentially of calcium, phosphorus, optionally iron, and oxygen. Preferably, the total content of calcium source, e.g., CaO, plus phosphate source, e.g., $P_2O_5$, is less than about 80 wt. %, based on the total weight of the CFP glass components. In one particularly preferred embodiment, the atomic Ca/P ratio is less than 0.35.

The phosphate source may be $P_2O_5$ or any raw material which provides a source of $P_2O_5$ upon heating including, but not limited to, $(NH_4)_3PO_4$, $NaPO_4$, $(NH_4)_2HPO_4$, $(NH_4)H_2PO_4$, $AlPO_4$ and $H_3PO_4$. Other phosphate sources contemplated herein include metal phosphate salts including, but not limited to, $Na_3PO_4$, $K_3PO_4$, $Li_3PO_4$, $Mg_3(PO_4)_2$, $Sr_3(PO_4)_2$, $Ba_3(PO_4)_2$, and $AlPO_4$. Some or all of both the requisite $P_2O_5$ and $Fe_2O_3$ content of the glass could be derived from suitable compounds comprising both iron and phosphorus (e.g., $H_2(FeP_3O_{10}).2H_2O$, $FePO_4$, $Fe_3(P_2O_7)_2$, $Fe_3(PO_4)_2.2H_2O$, $FePO_4.2H_2O$ and $Fe_4(P_2O_7)$). Some of all of both the requisite $P_2O_5$ and CaO could be derived from suitable compounds comprising both calcium and phosphorus (e.g., tricalcium phosphate, octacalcium phosphate, dicalcium phosphate dihydrate, hydroxyapatite, tricalcium phosphate, calcium pyrophosphate, calcium polyphosphate, synthetic apatite, natural apatite, and animal bones). Alternatively, phosphates produced in other waste-generating streams, for example the corrosion treatment of iron metals and fluorescent bulb recycling, may be used as the phosphate source for the manufacture of the CFP glasses.

With regards to the calcium source, CaO, quick lime and slaked lime may be used instead. Alternatively, the calcium source may also be anything which readily decomposes into CaO upon heating such as $CaCO_3$. In addition, calcium hydroxide, calcium hydrogen carbonate, calcium oxalate and calcium acetate may be used. When present, the preferred iron source is $Fe_2O_3$, however, as discussed hereinabove, some of the $Fe_2O_3$ content of the glass may be derived from suitable compounds including both iron and phosphorus. Further, when present, the ratio of Fe/P, in mole %, is in a range from about 0.005 to about 0.42.

In addition to CaO, $Fe_2O_3$, and $P_2O_5$, at least one additional oxide species may be present in the novel glass composition of the present invention including, but not limited to, NiO, MgO, $B_2O_3$, $Al_2O_3$, $Cr_2O_3$, $Y_2O_3$, $La_2O_3$, $CeO_2$, $TiO_2$, $MnO_2$, $Cu_2$, $Na_2O$, BaO, and combinations thereof. The cumulative amount for at least one additional species is preferably in a range from about 10.0 mol % to about 45.0 mol %, more preferably about 14.0 mol % to about 35.0 mol %. The novel glass composition may include small amounts of $ZrO_2$, preferably less than about 2.5 mol %; small amounts of $SiO_2$, preferably less than 10 wt %, and even more preferably less than 5 wt %; less than 6 wt. % SrO, more preferably less than 2 wt. % SrO, and most preferably less than about 1 wt. % SrO; less than about 2 mol % of alkali metal oxides (e.g., $Na_2O$, $K_2O$), more preferably less than about 1 mol %, and most preferably less than about 0.1 mol %; and are preferably devoid of tungsten and/or molybdenum species.

In a particularly preferred embodiment, the CFP glass composition includes at least one rare earth oxide species, (e.g., $La_2O_3$, $CeO_2$, $Y_2O_3$ and the oxides of Sc, Pr, Nd, Sm, Eu, Gd, Tb, Dy, Ho, Er, Tm, Yb, and Lu), in an amount in a range from about 0.1 mol % to about 11 mol %.

In addition, preferred embodiments of the CFP glass composition include fluoride salts such as $CaF_2$, $MgF_2$, $BaF_2$, $SrF_2$, and $AlF_3$.

In a preferred embodiment, the CFP glass composition made by combining CaO, $CaF_2$, $P_2O_5$, $Fe_2O_3$, and at least one additional oxide species, has the following range of ratios:

| component | mole % ratio range |
|---|---|
| Ca/P | about 0.04 to about 0.31 |
| Fe/P | about 0.08 to about 0.25 |
| O/P | about 3.18 to about 3.29 |

The amount of $CaF_2$ is in a range from about 1 to about 15 mol %, more preferably, about 4 to about 12 mol %, and most preferably, about 5 to about 10 mol %; and the cumulative amount of at least one additional oxide is in a range from about 5 to about 30 mol %, more preferably, about 8 to about 25 mol %, and most preferably, about 15 to about 22 mol %, based on the total number of moles in the composition. This embodiment may further include at least one rare earth oxide species in a cumulative amount in a range from about 1 to about 10 mol %, based on the total number of moles in the composition.

In another preferred embodiment, the CFP glass composition made by combining CaO, $CaF_2$, $P_2O_5$, and at least one additional oxide species, has the following range of ratios:

| component | mole % ratio range |
|---|---|
| Ca/P | about 0.25 to about 0.30 |
| O/P | about 3.10 to about 3.18 |

The amount of $CaF_2$ is in a range from about 1 to about 15 mol %, more preferably, about 4 to about 12 mol %, and most preferably, about 5 to about 10 mol %; and the cumulative amount of at least one additional oxide is in a range from about 5 to about 35 mol %, more preferably, about 10 to about 30 mol %, and most preferably, about 15 to about 25 mol %, based on the total number of moles in the composition. This embodiment may further include at least one rare earth oxide species in a cumulative amount in a range from about 1 to about 10 mol %, based on the total number of moles in the composition.

In still another preferred embodiment, the CFP glass composition made by combining CaO, $CaF_2$, $P_2O_5$, $Fe_2O_3$, and at least one additional oxide species, has the following range of ratios:

| component | mole % ratio range |
|---|---|
| Ca/P | about 0.30 to about 0.36 |
| Fe/P | about 0.02 to about 0.04 |
| O/P | about 3.35 to about 3.50 |

The amount of $CaF_2$ is in a range from about 0.5 to about 10 mol %, more preferably, about 1 to about 5 mol %; and the cumulative amount of at least one additional oxide is in a range from about 10 to about 50 mol %, more preferably, about 15 to about 40 mol %, and most preferably, about 20 to about 40 mol %, based on the total number of moles in the composition. This embodiment may further include at least one rare earth oxide species in a cumulative amount in a range from about 1 to about 10 mol %, based on the total number of moles in the composition.

In another preferred embodiment, the CFP glass composition made by combining CaO, $CaF_2$, $P_2O_5$, and at least one additional oxide species, has the following range of ratios:

| component | mole % ratio range |
|---|---|
| Ca/P | about 0.30 to about 0.35 |
| O/P | about 3.20 to about 3.28 |

Preferably, in this embodiment, the CFP glass composition includes NiO in a range from about 12 mol % to about 16 mol %, based on the total weight of the composition. This embodiment may further include at least one rare earth oxide species in a cumulative amount in a range from about 1 to about 10 mol %, based on the total number of moles in the composition.

In yet another preferred embodiment, the CFP glass composition is made by mixing at least CaO, $CaF_2$, $P_2O_5$, $Fe_2O_3$, and at least one of $La_2O_3$, $CeO_2$ and/or $Y_2O_3$, wherein the atomic Ca/P ratio is less than 0.35.

In another aspect, the present invention relates to a glass composition that is substantially devoid of calcium and iron. Specifically, the glass composition includes a phosphate source, at least one additional oxide species, and at least one rare earth oxide species, wherein the mole ratio of O/P is in a range from about 3.18 to about 3.30, wherein the cumulative amount of additional oxide species is in a range from about 30 mol % to about 50 mol %, and wherein the cumulative amount of rare earth oxide species is in a range from about 5 mol % to about 15 mol %, based on the total number of moles in the composition.

The CFP glass compositions of the invention are produced by combining the CaO (or any raw material which provides a source of CaO), $P_2O_5$ (or any raw material which provides a source of $P_2O_5$, optionally $Fe_2O_3$, and optionally at least one of the additional aforementioned oxide species, to form a homogeneous mixture, and melting said mixture in alumino-silicate crucibles at about 900 to about 1,200° C. for about two hours in air or an oxidizing atmosphere. Importantly, the actual melting temperature varies depending on the ratio of starting materials. If the reactants of the CFP glass composition are in a solid state, they are preferably pulverized prior to mixing.

Fiber may be made from the melt using means well known to those skilled in the art, e.g., drawn from melts in a bushing held at a pre-set temperature. Thus, as is disclosed in J. G. Mohr et al. "Fiber Glass," (Van Nostrand Reinhold Company, New York, 1978), the disclosure of which is hereby incorporated by reference into this specification, one may make fiber from applicants' glass compositions by a mineral wool process, a steam-blown process, a flame attenuation process, a spinning process, a rotary process, etc. Fiberization of CFP glasses has been done in Pt-alloy bushings at temperatures below 1150° C. Additionally, some CFP glasses have been pulled from the melt, continuously into fibers, at temperatures between 1100 and 1200° C. using alumino-silicate crucibles with suitable mullite nozzles. Some low temperature melting iron-phosphate glasses have been successfully pulled as continuous fibers from stainless steel bushings.

In addition, staple fibers, blown fibers, or microfibers may be produced from the glass melt.

In one preferred embodiment, the glass is made into continuous filament. As is known to those skilled in the art, one may use the marble melt process, the direct melt process, or the Strickland process for making continuous filament (see, e.g., Mohr et al.). Another reference which discloses means for preparing continuous glass fibers is K. L. Lowenstein's "The Manufacturing Technology of Continuous Glass Fibres," Elsevier Scientific Publishing Company, 3$^{rd}$ revised edition (New York, 1993), the disclosure of which is hereby incorporated by reference into this specification.

Importantly, the glass fibers may have any cross-sectional shape, e.g., circular, polygonal, symmetrical, non-symmetrical, ribbon-shaped, triangular, etc., and, if circular, may have a diameter in a range from about 0.1 μm to about 250 μm, more preferably from about 1 μm to about 100 μm, and even more preferably from about 5 μm to about 30 μm.

The glass fibers may be coated or uncoated, as readily determinable by one skilled in the art for the application where the glass fiber is to be used. The glass fibers may be polymer-coated to further protect them from the ambient environment (e.g., humidity, abrasion between the fibers and/or other surfaces), protect and lubricate the fibers during manufacturing (using an oil-starch composition), reinforce thermosetting resins, and reinforce cement. Common polymer-based coatings include formulations including, but not limited to, polyvinyl acetate, polyvinyl alcohol, and/or polyurethanes (see, e.g., Lowenstein).

The glass compositions of the invention possess good processing properties for the production of, for instance, blocks, sheets, rods, tubes, frits, microtape, wound forms, microspheres, powder and flakes, depending on the application, as readily determined by one skilled in the art.

The glasses of the present invention may have utility in many applications including, but not limited to: plastic, thermoplastic and thermoset resins, and concrete reinforcement; alkali-resistant mesh fabrics for construction components; asbestos replacement; fire-retardant products; vitrification of nuclear waste; insulation of car exhaust; acoustic and thermal insulation of car cabins; ship insulation and yacht composition parts; insulation and reinforcement in the aviation industry; glass fibers for air and liquid filtration applications; insulation and filtration in the chemical and food industry; temperature, cryogenic, electrical, and acoustical insulation in the energy sector; reinforcement in rubber belts; friction materials; adhesives; non-flammable curtains; stitching in high temperature filter bags; ceramic paper for gaskets, packing, etc.; glass wool designed for air filtration; oil mist filtration from industrial processes; enhance color tone and luster; roofing insulation; reduction of shrinkage cracks in concrete and polymers; resorbable glass scaffolds for use in biological applications; sheet-like glass fiber products; roofing membranes; and battery separators (for both acid-containing batteries and Ni—Cd batteries). In addition, the glass fibers may be finely ground and used in many of the aforementioned applications as well as to provide acid resistance to anti-corrosion paints.

The glass fibers of the invention may be used to reinforce rubbers and plastic. For example, long, rubber-coated strands may be used as tire cord and window screening and fiberglass scrim coated with PVC may be used to reinforce concrete. Chopped fibers of various lengths may be used in nylons and other polymers for reinforcement and both chopped and woven fibers may be used in liquid resin reinforcement such as polyesters and epoxys for boats, cars, electronic circuit boards, etc.

Of particular interest is the use of the glass fibers in glass fiber reinforced concrete (GFRC) products, wherein the alkaline resistant CFP fibers are uniformly dispersed throughout the concrete. The process of introducing fibers into concrete is well known in the art. For example, U.S. Pat. No. 6,582,511 in the name of Velpari, which is hereby incorporated by reference in its entirety, discloses concrete having improved plastic shrinkage crack resistance, said concrete comprising cement and chopped non-alkaline resistant glass fibers.

In addition, the CFP glass compositions of the invention may be used as rigid waste forms for the long-term internment and disposal of hazardous and radioactive wastes, in which the wastes are immobilized in vitrified CFP glass, and methods for the preparation of such waste forms. The CFP glasses advantageously exhibit exceptional chemical durability and resistance to corrosive attack such that the potential for release of the hazardous waste contained therein into the environment is minimized, they can be prepared at relatively low melt temperatures, they are compatible with relatively high concentrations of phosphate and halide metal waste, they can dissolve many of the nuclear wastes now being vitrified in higher melting borosilicate glasses, and such waste forms which can be prepared economically using conventional waste form fabrication technology. Reference is made to U.S. Pat. No. 5,750,824 in the name of Delbert E. Day, which is incorporated herein in its entirety.

Presently, the nuclear waste disposal industry immobilizes radioactive materials in stable, rigid waste forms by heating a mixture of the waste and a frit of an acceptable "host" glass to form a melt. The melt is transferred to a suitable container (e.g., stainless steel or aluminum alloy canisters) and cooled to form a rigid, typically vitreous waste form that traps the radioactive materials. This containment method is commonly referred to as vitrification. The waste forms are then sealed and transferred to a facility (e.g., an underground geologic repository) for long-term storage and monitoring.

This aspect relates to the use of the CFP glass compositions of the present invention as the frit, which is combined with hazardous and radioactive waste, heating said mixture to a temperature not greater than 1200° C. to form the CFP-waste glass composition, and cooling said melt to form a rigid waste form having hazardous and radioactive waste chemically dissolved therein, wherein the CFP glass frit has the following range of ratios:

| component | mole % ratio range |
| --- | --- |
| Ca/P | about 0.04 to about 0.50 |
| Fe/P | 0 to about 0.42 |
| O/P | about 3.10 to about 3.55 |

The composition of said batch mixture and the rate of cooling of said melt are controlled such that said waste form is substantially vitreous. In addition, the viscosity of the melt is preferably less than 100 P at the melting temperature.

Importantly, many of the elements of the CFP glasses of the present invention, including Fe, P, F, alkaline earth cations, rare earth cations and Cr are already present in the existing hazardous waste material, however, the exact amount varies from site to site.

Advantageously, the CFP glasses of the present invention overcome many problems associated with conventionally-used borosilicate glass including, but not limited to, shorter melting time at lower temperatures, a relatively high devitrification or recrystallization temperature to avoid decreases in the stability of the waste form at elevated storage temperatures produced by the decay of radioactive species, higher waste loading, and outstanding chemical durability.

The features and advantages of the invention are more fully illustrated by the following non-limiting examples, wherein all parts and percentages are by mole, unless otherwise expressly stated.

EXAMPLE 1

Various embodiments of CFP glass were prepared, as shown herein below in Table 1, wherein all percentages are mole percents, based on the total number of moles of the glass.

TABLE 1

Data for CFP compositions.

| mol % | ARP-87 | SIP-16 | SIP-17 | SIP-19 | SIP-21 | SIP-22 | SIP-37 | SIP-48 | SIP-51 | SIP-52 | SIP-59 |
|---|---|---|---|---|---|---|---|---|---|---|---|
| $P_2O_5$ | 60.0 | 60.0 | 43.10 | 43.1 | 43.10 | 43.10 | 60.0 | 60.0 | 55.0 | 55.0 | 49.0 |
| CaO | 5.0 | 5.0 | 29.70 | 29.7 | 29.70 | 29.70 | 15.0 | 10.0 | 18.0 | 18.0 | 30.0 |
| NiO | 5.0 | 5.0 | 0.00 | 0.0 | 0.00 | 0.00 | 2.5 | 2.50 | 2.0 | 2.0 | 2.0 |
| MgO | 0.0 | 0.0 | 2.00 | 2.0 | 2.00 | 2.00 | 0.0 | 5.0 | 7.5 | 7.5 | 9.0 |
| BaO | 0.0 | 0.0 | 0.00 | 0.0 | 0 | 0 | 0.0 | 0.0 | 0.0 | 0.0 | 0.0 |
| $SiO_2$ | 0.0 | 0.0 | 4.30 | 4.3 | 4.30 | 4.30 | 0.0 | 0.0 | 0.0 | 0.0 | 0.0 |
| $TiO_2$ | 0.0 | 0.0 | 0.00 | 0.0 | 0 | 0 | 0.0 | 0.0 | 0.0 | 0.0 | 0.0 |
| $B_2O_3$ | 0.0 | 0.0 | 0.00 | 0.0 | 0.0 | 0.0 | 0.0 | 0.0 | 0.0 | 0.0 | 0.0 |
| $Al_2O_3$ | 5.0 | 0.0 | 1.90 | 0.0 | 0 | 0 | 0.0 | 0.0 | 0.0 | 0.0 | 0.0 |
| $Fe_2O_3$ | 15.0 | 15.0 | 9.40 | 9.4 | 4.70 | 7.04 | 5.0 | 5.0 | 8.0 | 8.0 | 4.0 |
| $Cr_2O_3$ | 5.0 | 5.0 | 0.00 | 0.0 | 0 | 0 | 5.0 | 5.0 | 2.0 | 2.0 | 2.0 |
| $Y_2O_3$ | 0.0 | 5.0 | 1.90 | 0.0 | 4.25 | 3.08 | 5.0 | 5.0 | 0.0 | 5.0 | 3.4 |
| $La_2O_3$ | 0.0 | 0.0 | 0.00 | 3.8 | 4.25 | 3.08 | 5.0 | 5.0 | 5.0 | 0.0 | 0.0 |
| $MnO_2$ | 5.0 | 0.0 | 0.00 | 0.0 | 0 | 0 | 2.5 | 2.5 | 2.5 | 2.5 | 0.6 |
| $Na_2O$ | 0.0 | 0.0 | 1.00 | 1.0 | 1 | 1 | 0.0 | 0.0 | 0.0 | 0.0 | 0.0 |
| $K_2O$ | 0.0 | 0.0 | 0.00 | 1.0 | 0 | 0 | 0.0 | 0 | 0.0 | 0.0 | 0.0 |
| $CaF_2$ | 0.0 | 6.7 | 6.70 | 6.7 | 6.70 | 6.70 | 0.0 | 0.0 | 0.0 | 0.0 | 0.0 |
| Total % | 100 | 100 | 100 | 100 | 100 | 100 | 100 | 100 | 100 | 100 | 100 |
| Ca/P ratio | 0.04 | 0.04 | 0.42 | 0.42 | 0.42 | 0.42 | 0.13 | 0.08 | 0.16 | 0.16 | 0.31 |
| Fe/P ratio | 0.25 | 0.25 | 0.22 | 0.22 | 0.15 | 0.07 | 0.08 | 0.08 | 0.15 | 0.15 | 0.08 |
| O/P ratio | 3.29 | 3.29 | 3.44 | 3.44 | 3.44 | 3.44 | 3.19 | 3.19 | 3.20 | 3.20 | 3.22 |
| $T_d$ (°C.) | 622 | 647 | 600 | 588 | 590 | 594 | 606 | 608 | 619 | 603 | 619 |
| CTE (ppm °$C^{-1}$) | 7.3 | 7.3 | 9.8 | 10.6 | nm | nm | 7.3 | nm | 8.9 | 8.9 | 12.2 |
| $\rho$ (g $cm^{-3}$) | 2.90 | 3.00 | nm | 2.99 | 3.07 | 3.05 | 2.93 | nm | 2.89 | 2.91 | 2.99 |
| E (GPa) | 69.60 | 70.7 | 69.7 | 71.4 | 67.30 | 67.50 | 71.2 | 67.4 | 75.5 | 66.0 | 72.7 |

| mol % | SIP-60 | SIP-88 | SIP-91 | SIP-92 | SIP-93 | SIP-94 | SIP-95 | SIP-96 | SIP-97 | SIP-98 |
|---|---|---|---|---|---|---|---|---|---|---|
| $P_2O_5$ | 50.0 | 48.0 | 48.0 | 48.0 | 48.0 | 48.0 | 48.0 | 48.0 | 48.0 | 48.0 |
| CaO | 31.0 | 16.0 | 18.0 | 18.0 | 18.0 | 18.0 | 15.0 | 15.0 | 18.0 | 18.0 |
| NiO | 2.0 | 4.0 | 4.0 | 6.0 | 4.0 | 4.0 | 4.0 | 4.0 | 4.0 | 4.0 |
| MgO | 5.0 | 6.0 | 6.0 | 6.0 | 6.0 | 8.0 | 8.0 | 8.0 | 6.0 | 6.0 |
| BaO | 0.0 | 2.0 | 3.0 | 3.0 | 3.0 | 3.0 | 3.0 | 3.0 | 3.0 | 3.0 |
| $SiO_2$ | 0.0 | 6.0 | 5.0 | 3.0 | 3.0 | 1.0 | 0.0 | 0.0 | 5.0 | 3.0 |
| $TiO_2$ | 0.0 | 2.0 | 4.0 | 4.0 | 4.0 | 4.0 | 4.0 | 4.0 | 2.0 | 4.0 |
| $B_2O_3$ | 0.0 | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 | 0.0 |
| $Fe_2O_3$ | 5.0 | 4.0 | 0.0 | 0.0 | 0.0 | 0.0 | 0.0 | 0.0 | 2.0 | 2.0 |
| $Cr_2O_3$ | 2.0 | 0.0 | 0.0 | 0.0 | 0.0 | 0.0 | 0.0 | 0.0 | 0.0 | 0.0 |
| $Y_2O_3$ | 4.4 | 4.0 | 4.0 | 4.0 | 4.0 | 4.0 | 6.0 | 0.0 | 4.0 | 4.0 |
| $La_2O_3$ | 0.0 | 0.0 | 0.0 | 0.0 | 2.0 | 2.0 | 0.0 | 6.0 | 0.0 | 0.0 |
| $MnO_2$ | 0.6 | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 4.0 | 4.0 | 0.0 | 0.0 |
| $K_2O$ | 0.0 | 0.0 | 0.0 | 0.0 | 0.0 | 0.0 | 4.0 | 4.0 | 0.0 | 0.0 |
| $CaF_2$ | 0.0 | 8.0 | 8.0 | 8.0 | 8.0 | 8.0 | 4.0 | 4.0 | 8.0 | 8.0 |
| Total % | 100 | 100 | 100 | 100 | 100 | 100 | 100 | 100 | 100 | 100 |
| Ca/P ratio | 0.31 | 0.25 | 0.27 | 0.27 | 0.27 | 0.27 | 0.20 | 0.20 | 0.27 | 0.27 |
| Fe/P ratio | 0.10 | 0.08 | 0 | 0 | 0 | 0 | 0 | 0 | 0.04 | 0.04 |
| O/P ratio | 3.23 | 3.21 | 3.14 | 3.11 | 3.16 | 3.14 | 3.17 | 3.17 | 3.16 | 3.16 |
| $T_d$ (°C.) | 636 | 619 | 605 | 610 | 615 | 610 | 610 | 610 | 607 | 623 |
| CTE (ppm °$C^{-1}$) | 9.7 | 9.9 | 9.5 | 10.4 | 10.8 | 10.8 | 10.7 | 10.8 | 10.3 | 10.0 |
| $\rho$ (g $cm^{-3}$) | 3.00 | 2.90 | 2.84 | 2.92 | 2.99 | 2.98 | 2.92 | 3.05 | 2.98 | 2.99 |
| E (GPa) | 69.5 | 64.0 | 58.4 | 62.5 | 62.1 | 63.5 | 61.0 | 60.9 | 63.5 | nm |

| mol % | SIP-119 | SIP-120 | SIP-122 | SIP-129 | SIP-129-X5 | SIP-148 | SIP-149 |
|---|---|---|---|---|---|---|---|
| $P_2O_5$ | 48.0 | 45.0 | 45.0 | 39.0 | 43.00 | 50.0 | 43.0 |
| CaO | 20.0 | 20.0 | 20.0 | 24.0 | 23.07 | 0.0 | 13.0 |
| NiO | 0.0 | 2.0 | 0.0 | 4.0 | 2.83 | 10.0 | 13.0 |
| MgO | 1.0 | 8.0 | 8.0 | 14.0 | 12.00 | 10.0 | 12.0 |
| BaO | 7.0 | 5.0 | 5.0 | 8.0 | 9.00 | 10.0 | 9.0 |
| $SiO_2$ | 3.0 | 3.0 | 3.0 | 0.0 | 0.00 | 0.0 | 0.0 |
| $TiO_2$ | 3.0 | 3.0 | 5.0 | 4.0 | 4.00 | 10.0 | 4.0 |
| $B_2O_3$ | 0.0 | 3.0 | 3.0 | 0.0 | 0.00 | 0.0 | 0.0 |
| $Al_2O_3$ | 0.0 | 0.0 | 0.0 | 0.0 | 0.00 | 0.0 | 0.0 |
| $Fe_2O_3$ | 0.0 | 0.0 | 0.0 | 1.0 | 0.60 | 0.0 | 0.0 |
| $Cr_2O_3$ | 0.0 | 0.0 | 0.0 | 0.0 | 0.00 | 0.0 | 0.0 |
| $Y_2O_3$ | 4.0 | 4.0 | 4.0 | 4.0 | 2.50 | 10.0 | 3.0 |
| $La_2O_3$ | 0.0 | 0.0 | 0.0 | 0.0 | 0.00 | 0.0 | 0.0 |
| $MnO_2$ | 0.0 | 0.0 | 0.0 | 0.0 | 0.00 | 0.0 | 0.0 |

TABLE 1-continued

Data for CFP compositions.

| | | | | | | | |
|---|---|---|---|---|---|---|---|
| Na$_2$O | 0.0 | 0.0 | 0.0 | 0.0 | 0.00 | 0.0 | 0.0 |
| K$_2$O | 0.0 | 0.0 | 0.0 | 0.0 | 0.00 | 0.0 | 0.0 |
| CaF$_2$ | 0.0 | 7.0 | 7.0 | 2.0 | 3.00 | 0.0 | 3.0 |
| Total % | 100 | 100 | 100 | 100 | 100 | 100 | 100 |
| Ca/P ratio | 0.21 | 0.22 | 0.22 | 0.31 | 0.27 | 0.0 | 0.31 |
| Fe/P ratio | 0 | 0 | 0 | 0.03 | 0.01 | 0.0 | 0 |
| O/P ratio | 3.19 | 3.26 | 3.28 | 3.44 | 3.25 | 3.30 | 3.24 |
| T$_d$ (° C.) | 597 | 624 | nm | 613 | nm | nm | nm |
| CTE (ppm ° C.$^{-1}$) | 9.8 | 9.9 | nm | 10.6 | nm | nm | nm |
| ρ (g cm$^{-3}$) | 2.85 | 2.88 | nm | 3.10 | 3.05 | nm | 2.61 |
| E (GPa) | 64.20 | 61.40 | nm | 70.70 | 70.1 | nm | nm | nm: not measured

The glasses were subjected to a series of experiments to determine several thermal properties including the dilatometric softening point in degrees Celsius (T$_d$), the coefficient of thermal expansion in ppm/° C. (CTE), the density in g/cm$^3$ (ρ), and the elastic modulus in GPa (E).

The dilatometric softening point and the CTE of the bulk glasses were determined using dilatometry (Orton Dilatometer 1600D, Westerville, Ohio), whereby the heating rate was 3° C./min. Density was measured on bulk pieces of glass using the Archimedes method with deionized water as the buoyancy fluid. The elastic modulus was determined for glass fibers (~200-300 μm diameter) drawn from melts using a resonance method described in ASTM-C623 entitled "Test Method for Young's Modulus, Shear Modulus, and Poisson's Ratio for Glass and Glass-Ceramics by Resonance." The results are reported in Table 1 hereinabove.

Figure 1:
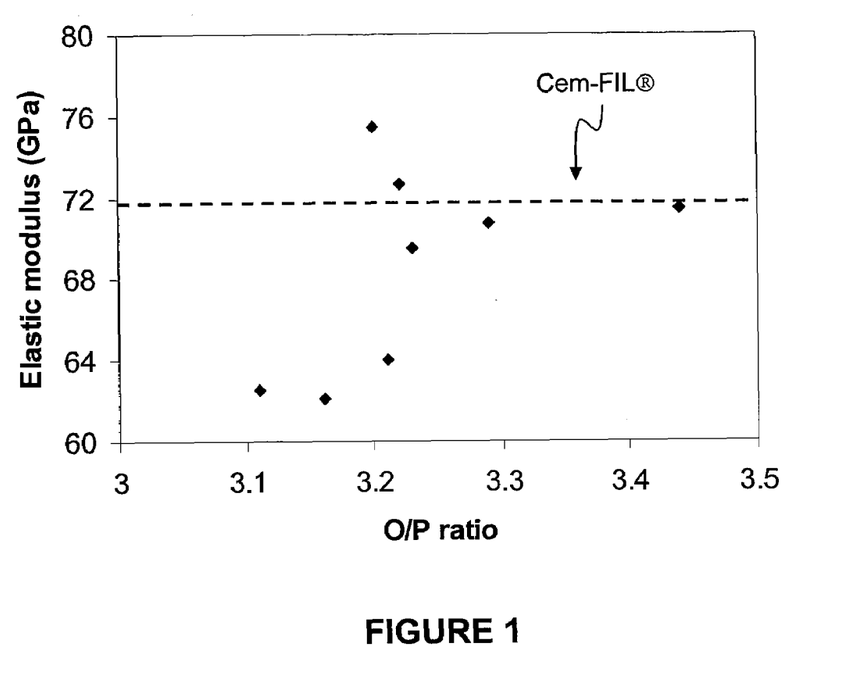
FIG. 1 is an illustration of the measured elastic modulus of the CFP glasses of the invention relative to the commercially used Cem-FIL® glass fibers.

Importantly, Cem-FIL® (Vetrotex Spain S.A.) and E-glass have elastic moduli of 71.7 and 81.6 GPa, respectively. Comparing the elastic moduli of the commercial fibers to those described herein, as shown schematically in FIG. 1, it can be seen that the CFP glasses of the invention have similar elastic moduli to Cem-FIL®. As such, the CFP glasses of the invention possess promising properties for cement reinforcement.

EXAMPLE 2

Various embodiments of CFP glass were prepared using calcium phosphate material recovered from fluorescent lightbulbs, as shown hereinbelow in Table 2, wherein all percentages are mole percents, based on the total number of moles of the glass.

TABLE 2

Selected alkaline resistant CFP compositions.

| mol % | SR-12 | SR-13 | SR-14 | SR-15 | SR-16 | SR-17 |
|---|---|---|---|---|---|---|
| P$_2$O$_5$ | 47.75 | 47.48 | 44.28 | 41.93 | 41.60 | 46.24 |
| Al$_2$O$_3$ | 1.02 | 0.77 | 0.72 | 0.68 | 0.67 | 0.61 |
| Fe$_2$O$_3$ | 4.56 | 5.49 | 3.27 | 2.49 | 6.10 | 3.77 |
| SiO$_2$ | 7.57 | 6.68 | 6.23 | 5.90 | 3.67 | 3.25 |
| CaO | 33.49 | 33.82 | 31.14 | 25.54 | 27.13 | 29.97 |
| Na$_2$O | 1.58 | 1.50 | 1.33 | 0.70 | 0.75 | 0.66 |
| MgO | 1.38 | 1.55 | 10.51 | 19.60 | 19.48 | 15.00 |
| Y$_2$O$_3$ | 0.58 | 0.48 | 0.41 | 0.39 | 0.39 | 0.34 |
| La$_2$O$_3$ | 1.83 | 1.85 | 1.93 | 1.81 | 0.03 | 0.03 |
| MnO$_2$ | 0.13 | 0.15 | 0.18 | 0.18 | 0.18 | 0.11 |
| Ce$_2$O$_3$ | 0.01 | 0.01 | 0.01 | 0.01 | 0.01 | 0.01 |
| SrO | 0.07 | 0.07 | 0.05 | 0.04 | 0.03 | 0.01 |
| BaO | 0.02 | 0.02 | 0.02 | 0.02 | 0.02 | 0.00 |

TABLE 2-continued

Selected alkaline resistant CFP compositions.

| mol % | SR-12 | SR-13 | SR-14 | SR-15 | SR-16 | SR-17 |
|---|---|---|---|---|---|---|
| PbO | 0.01 | 0.01 | 0.01 | 0.01 | 0.01 | 0.00 |
| Sb$_2$O$_3$ | 0.00 | 0.00 | 0.00 | 0.00 | 0.00 | 0.00 |
| Total % | 100 | 100 | 100 | 100 | 100 | 100 |
| Ca/P ratio | 0.35 | 0.36 | 0.35 | 0.30 | 0.33 | 0.32 |
| Fe/P ratio | 0.1 | 0.12 | 0.07 | 0.06 | 0.15 | 0.08 |
| O/P ratio | 3.29 | 3.30 | 3.34 | 3.38 | 3.42 | 3.22 |
| T$_d$ (° C.) | 565 | 559 | 572 | 587 | 619 | 620 |
| CTE (ppm ° C.$^{-1}$) | 10.4 | 12.2 | 11.2 | 10.9 | nm | nm |
| ρ (g cm$^{-3}$) | 2.78 | 2.80 | 2.79 | 2.78 | 2.82 | nm |
| E (GPa) | 61.0 | 61.4 | 61.2 | 64.0 | 75.3 | nm | nm: not measured

Similar to the glasses of Example 1, the glasses of Example 2 were subjected to a series of experiments to determine several thermal properties including the dilatometric softening point in degrees Celsius (T$_d$), the coefficient of thermal expansion in ppm/° C. (CTE), the density in g/cm$^3$ (ρ), and the elastic modulus in GPa (E).

Comparing the elastic moduli of the commercial fibers to those of the CFP glasses prepared using recovered calcium phosphate material, it can be seen that the CFP glasses have similar elastic moduli to Cem-FIL®. As such, the CFP glasses of the invention possess promising properties for cement reinforcement. In addition, the CFP glasses represent a promising use for waste byproducts of another industry.

EXAMPLE 3

Figure 5:
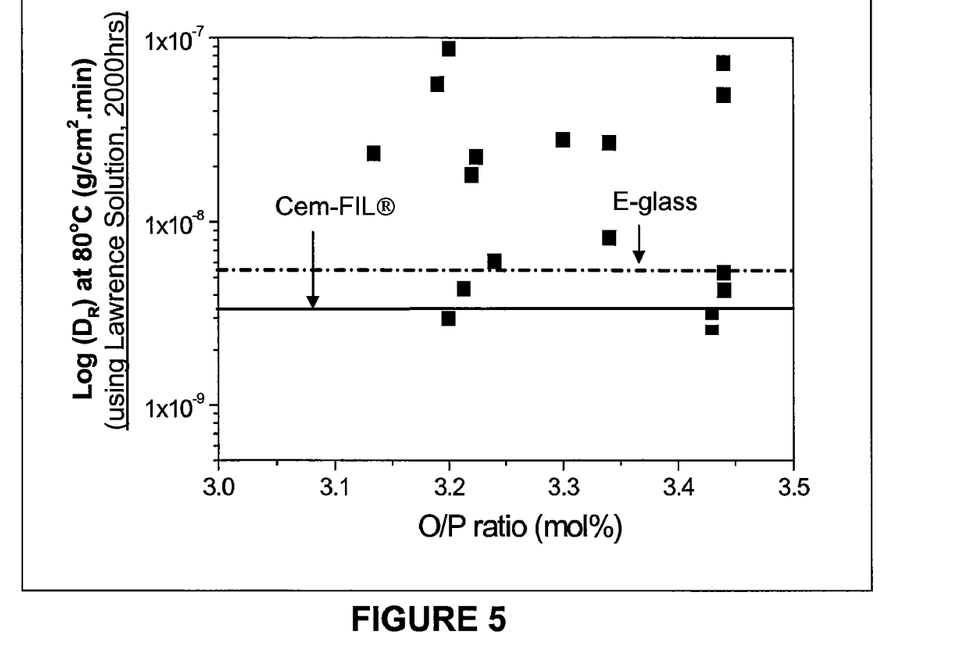
FIG. 5 illustrates the dissolution rate of CFP glass tiles as a function of O/P ratios following immersion in a Lawrence solution at 80° C. for 2000 hours.

The chemical durability of glass tiles made of E-glass, Cem-FIL® and the CFP glasses of the invention were evaluated in 100 mL of a synthetic cement effluent known as a Lawrence solution which comprises 0.48 g/L Ca(OH)$_2$, 0.88 g/L NaOH, and 3.45 g/L KOH and has a pH of approximately 13, at 80° C. up to 2000 h (surface area to volume ratio of 0.07 cm$^{-1}$). The glass samples were removed periodically and the weight changes recorded and the surface reaction products characterized using x-ray diffraction. The results, which include the dissolution rate in g cm$^{-2}$ min$^{-1}$, are reported in Table 3 hereinbelow, and shown schematically in FIG. 5.

TABLE 3

Dissolution rate at 80° C. of several CFP glasses in Lawrence solution.

| Glass | dissolution rate/ $g\,cm^{-2}\,min^{-1}$ |
|---|---|
| Cem-FIL ® | $3.3 \times 10^{-9}$ |
| E-glass | $5.4 \times 10^{-9}$ |
| SIP-08 | $8.2 \times 10^{-9}$ |
| SIP-16 | $5.4 \times 10^{-9}$ |
| SIP-19 | $9.2 \times 10^{-10}$ |
| SIP-21 | $5.3 \times 10^{-9}$ |
| SIP-22 | $4.3 \times 10^{-9}$ |
| SIP-37 | $1.4 \times 10^{-9}$ |
| SIP-48 | $5.6 \times 10^{-8}$ |
| SIP-51 | $6.1 \times 10^{-9}$ |
| SIP-52 | $8.7 \times 10^{-8}$ |
| SR-8 | $6.5 \times 10^{-7}$ |
| SR-16 | $2.3 \times 10^{-8}$ |

Comparing the dissolution rates of the CFP glasses of the invention to the commercial silicate glasses (i.e., CFP glasses, Cem-FIL®, and E-glass), it can be seen that the CFP glasses are as chemically resistant, if not more chemically resistant than the commercial glasses.

In addition, the final pH of the Lawrence solution was evaluated after several uncoated fibers (20-25 microns in diameter) were immersed in 100 mL of said solution for 1000 hr at 80° C. (surface area/volume ~0.21 $cm^{-1}$), as shown schematically in FIG. 6. Ideally, a constant pH that is close to that of Lawrence solution (~13) is desired which means that the glass fiber has not reacted with the solution. Phosphate glasses that react with the Lawrence solution cause the pH to decrease more substantially, presumably because of the formation of phosphoric acid through the release of phosphate anions from the glass. The final pH of the Lawrence solution having the CFP fibers immersed therein was determined to be between 12.80 and 12.99, and as such, these glass fibers are substantially alkaline resistant. For comparison purposes, the final pH of Lawrence solution following immersion of uncoated CemFIL® fibers at 80° C. for 1000 h was 12.9.

Interestingly, a corrosion layer has been found on the surfaces of these chemically stable glasses, said corrosion layer being identified as hydroxyapatite ($Ca_5(PO_4)_3OH$) or HAP using x-ray diffraction. HAP is chemically stable in this highly alkaline pH range and this corrosion layer may serve the same role as the zirconia-rich surface layer that forms on conventional AR glasses to slow the reaction kinetics in cement environments.

EXAMPLE 4

Figure 2:
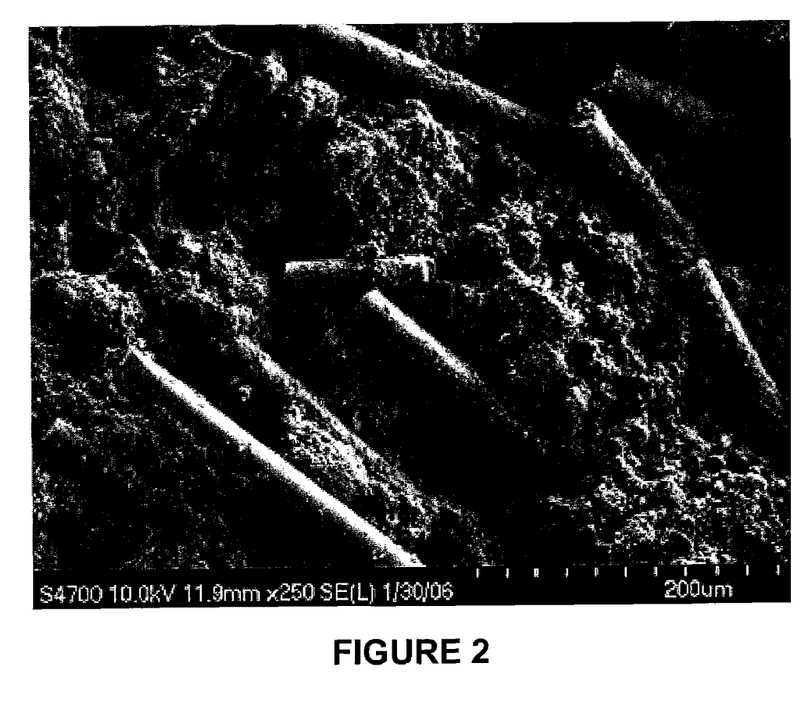
FIG. 2 is a scanning electron micrograph of the SIP-91 fibers after being in a cement coupon for 5 days at 22° C.

Uncoated SIP-91 fibers (fiber diameter ~25 μm) were mixed with Portland cement to form a GFRC coupon. The coupon was prepared by hand mixing 250 g of Portland cement with 2 wt. % fiber (chopped to ~⅜") and 100 g of water until a homogenous mix was obtained. The GFRC mix was then divided into several test molds and sealed in plastic bags. The cement coupons were stored at room temperature (22° C.) for up to five days before the coupons were fractured and the fracture surfaces evaluated. FIG. 2 shows that significant fiber pull-out was observed for the SIP-91 composition, a desirable feature found in commercial cement products made with Cem-FIL® fiber compositions.

EXAMPLE 5

Figure 3:
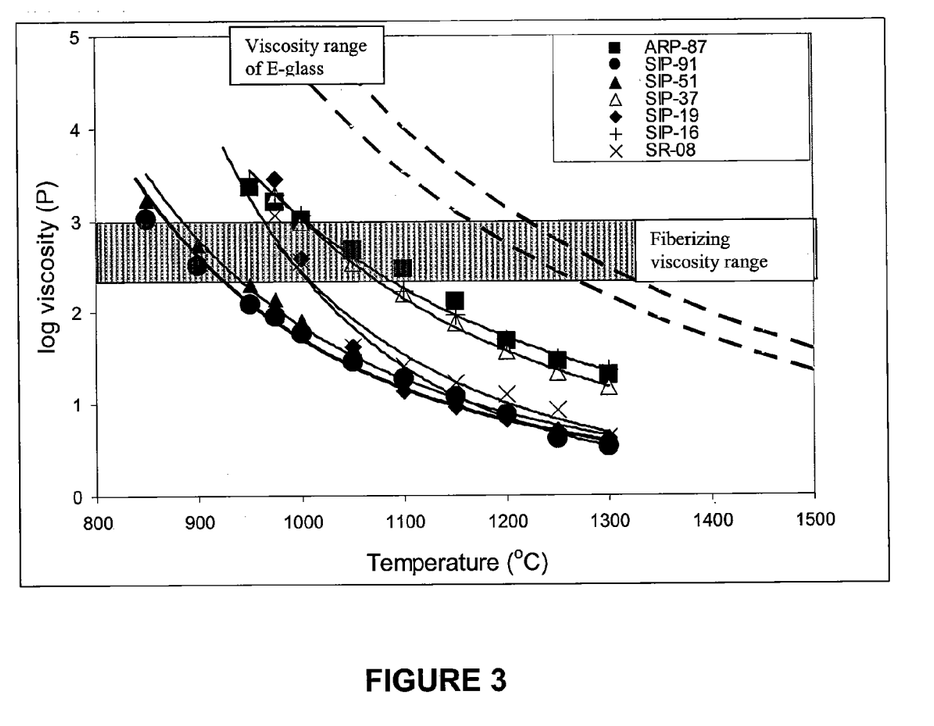
FIG. 3 is a plot of the logarithm of viscosity as a function of temperature for several CFP melts of the present invention. The viscosity range for pulling fibers is shown in grey.
Figure 4:
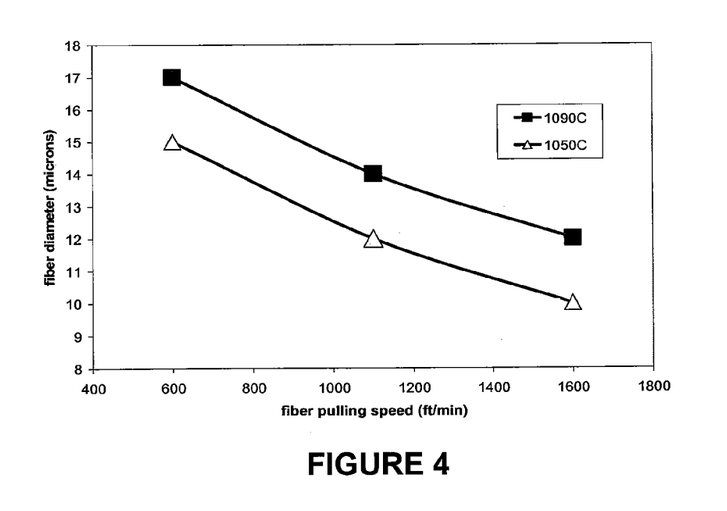
FIG. 4 illustrates the dependence of the fiber diameter on the melt temperature and the pulling speeds for SIP-91 fibers pulled from a four-nozzle platinum bushing.

FIG. 3 shows the dependence of viscosity as a function of temperature for several CFP melts of the present invention. The grey region indicates the viscosity range where continuous fibers (300-1000 P) are pulled from silicate melts. The shape of the viscosity curve helps identify good fiber-forming melts, as indicated by the slope of the curves where the viscosity changes gradually in the desired fiber-forming viscosity range (~300 to 1000 P). For comparison, FIG. 3 and Table 4 includes the melt viscosity of commercial E-glass (about 1000 P), a common silicate-based fiber on the market [21]. FIG. 3 also indicates that SIP-91 fibers could be processed at temperatures near 900° C., about 300° C. lower than for commercial alkaline resistant silica-based fibers such as Cem-FIL® and NEG AR (Nippon Electric Glass Company Ltd., Japan).

TABLE 4

Viscosity-temperature data for commercial silicate glasses.

| | Ca—Fe-phosphate glasses | E-glass | Cem-FIL ® | NEG AR |
|---|---|---|---|---|
| Liquidus temperature, ° C. | 950-1150 | 1140 | 1201 | 1172 |
| Fiberizing temperature, ° C. | 1000-1170 | 1200 | 1470 | 1290 |
| Melting temperature, ° C. | 1100-1200 | 1500 | 1600 | 1600 |

Data for silicate glasses is from Lowenstein, $3^{rd}$ edition

Importantly, referring to FIG. 3, the higher the O/P ratio (SR-8 and SIP-19) which is indicative of a pyrophosphate composition, the steeper the viscosity-temperature curves, and the more difficult it is to draw fibers from the specific melts.

EXAMPLE 6

Figure 6:
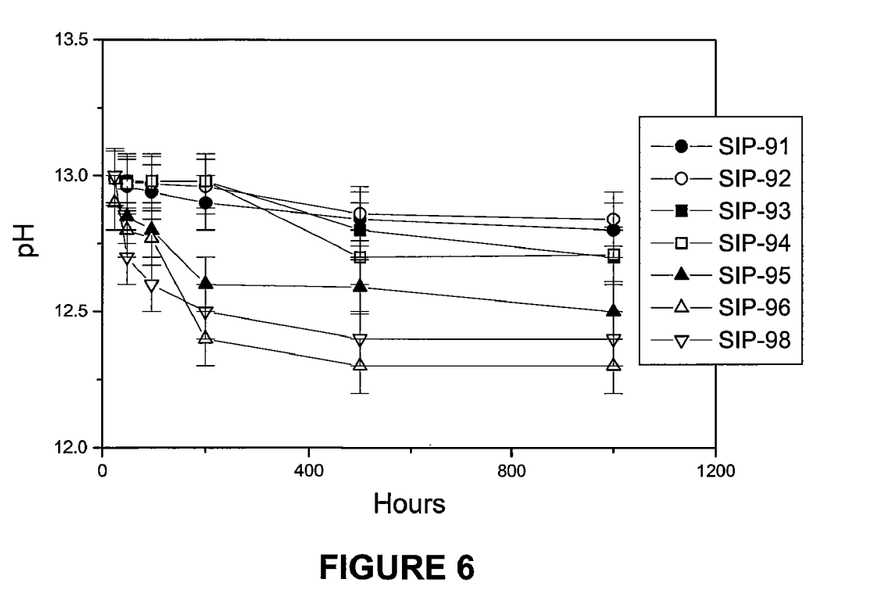
FIG. 6 illustrates the change in pH as a function of time following immersion of un-coated CFP glass fibers in Lawrence solution at 80° C. (surface area to volume ratio of 0.21 $cm^{-1}$).

The SIP-91 CFP glass, selected on the basis of its relatively good chemical durability in cement coupons, was melted and quenched to frit at MO-SCI Corporation (Rolla, Mo.). Continuous fibers of good quality were successfully pulled from the SIP-91 melt. FIG. 6 illustrates how the diameter of fibers of the SIP-91 composition change with the melt temperature and pulling speed for fibers pulled from a four-nozzle Pt-bushing (~1 mm diameter nozzle). These results indicate that the CFP glass fibers can be manufactured within the diameter range of 9 to 30 μm, a size range commonly used for the silica-based fibers for cement reinforcement [22].

The CFP glass compositions of the invention can also be continuously pulled at temperatures below 1200° C. from alumino-silicate or alumina crucibles using ceramic nozzles, or some other refractory oxide that does not react appreciably with the melt. The estimated throughput for a ceramic bushing containing three 2 mm diameter nozzles, is ~0.02 lb/h per nozzle.

EXAMPLE 7

Figure 7:
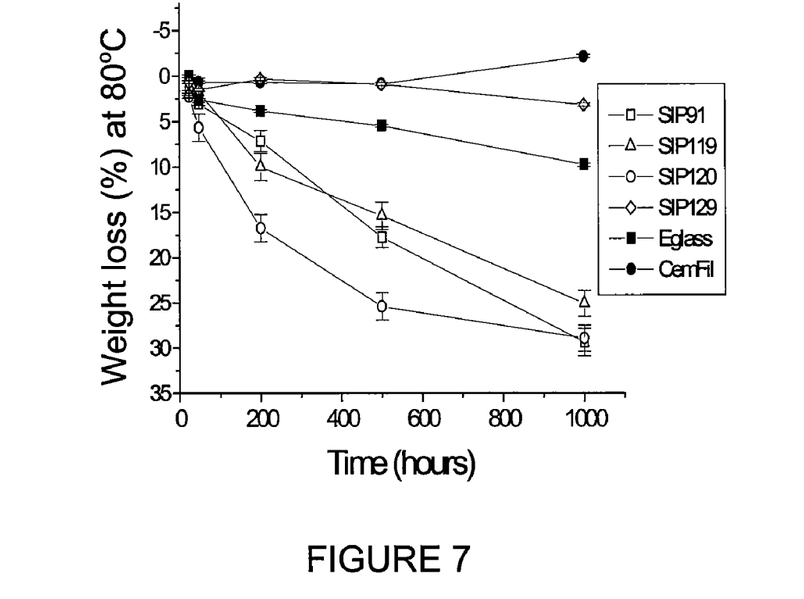
FIG. 7 illustrates the weight loss of bare CFP glass fibers in Lawrence solution at 80° C. (surface area to volume ratio of 11.4 $cm^{-1}$) over 1000 hr.

The chemical durability of bare glass fibers made of E-glass, Cem-FIL® and the CFP glasses of the invention (SIP-91, SIP-119, SIP-120 and SIP-129) were evaluated in 100 mL of a Lawrence solution at 80° C. for 1000 h (surface area to volume ratio of 11.4 $cm^{-1}$). The glass samples were removed periodically and the weight changes recorded and the surface reaction products characterized using x-ray diffraction. The results are shown in FIG. 7. It can be seen that SIP-129 is as alkaline resistant as Cem-FIL®.

EXAMPLE 8

Figure 8:
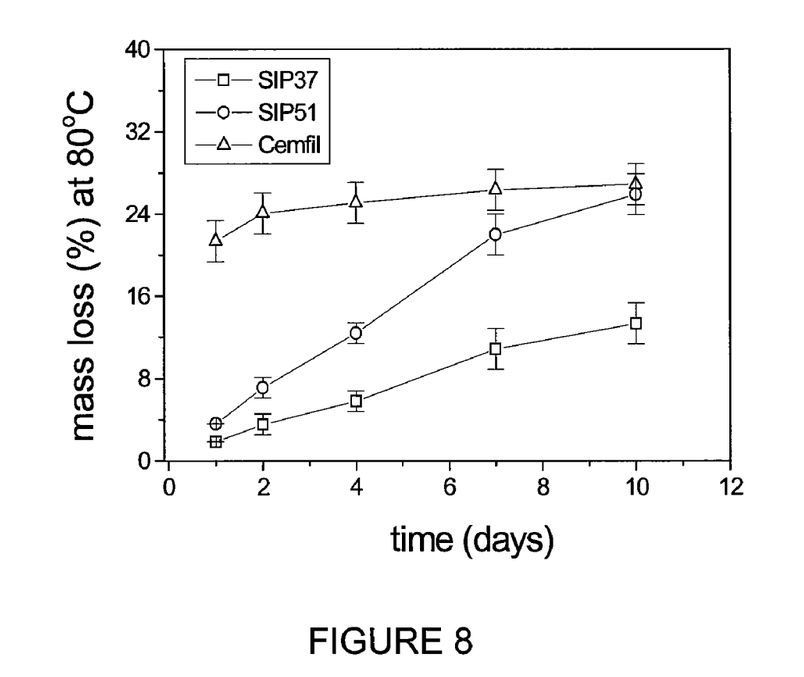
FIG. 8 illustrates the weight loss of bare SIP-37 and SIP-51 glass fibers compared to Cem-FIL® fibers in 10% HF at 80° C. (surface area to volume ratio of 11.4 $cm^{-1}$) over 10 days.

Even though the glass fibers of the invention were initially developed to be alkaline resistant, it was surprisingly discovered that some are resistant in acidic environments as well, which would make them useful as battery separators. Towards that end, the chemical durability of SIP-37 and SIP-51 glass fibers in a low pH (acidic) environment was evaluated in a sulfuric acid solution having a pH of approximately 3 at 80° C. for 10 days, or a 10 wt. % HF solution at 22° C. or 80° C. for 10 days. For comparison purposes, the commercial silica-based Cem-FIL® was also evaluated in the same acidic solutions at the same conditions. The glass samples were removed periodically and the weight changes recorded. Referring to FIG. 8, it can be seen that SIP-37 and SIP-51 are more chemically resistant in 10 wt.% HF solutions at 80° C. for 10 days (SA/V ~11.4 $cm^{-1}$) than Cem-FIL®.

EXAMPLE 9

Figure 9:
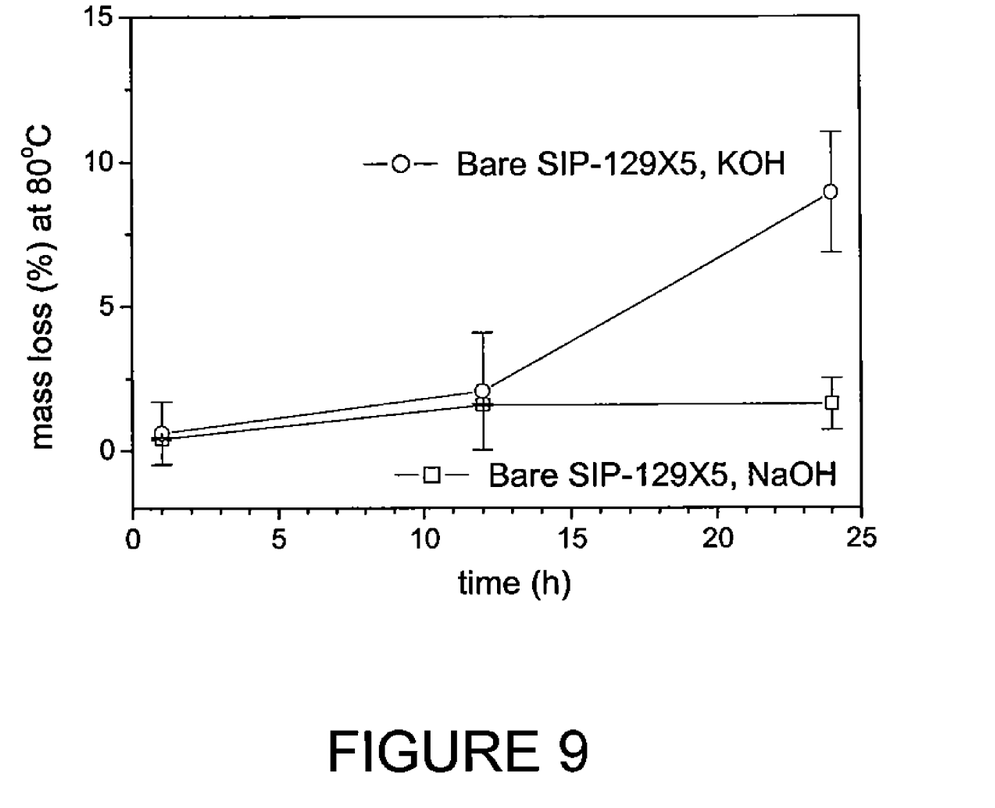
FIG. 9 illustrates the weight loss of bare SIP-129 glass fibers in 10% NaOH and 30% KOH at 80° C. (surface area to volume ratio of 11.4 $cm^{-1}$) for 24 hr.

Bare SIP-129-X5 iron phosphate fibers were immersed in 10% NaOH (2.6 M) or 30% KOH (6.7 M) at 80° C. for 24 hr to determine their chemical durability in alkaline solutions. The ratio of surface are to solution volume was approximately 11.4 $cm^{-1}$ and the diameter of the SIP-129-X5 fibers was in a range from about 40 to 140 μm. The glass samples were removed periodically and the weight changes recorded. Referring to FIG. 9, it can be seen that bare SIP-129-X5 fibers have a higher stability in the NaOH than the KOH solution, which is expected due to the higher molarity of the KOH.

In addition, the SIP-122 fibers were immersed in both solutions and the IR spectra of each after immersion at 80° C. for 24 hr in the respective solutions were similar, indicating a similar corrosion mechanism. In addition, the SIP-129 fibers were immersed in both solutions and the IR spectra of each after immersion at 80° C. for 24 hr in the respective solutions were dominated by pyrophosphate bands around 560 $cm^{-1}$ and 1090 $cm^{-1}$ [23,24].

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

1. Innovation by Design: *Glass Fiber Reinforced Concrete Cladding*; Publication GFRC-3-01 of the Precast/Prestressed Concrete Institute, 1993; www.pci.org
2. B. A. Proctor, D. R. Oakley, K. L. Litherland, "Developments in the Assessment and Performance of GRC over 10 Years," *Composites,* 13[2] 173-179 (1982)
3. M. S. Stucke, A. J. Majumdar, "Microstructure of Glass Fiber-Reinforced Cement Composite," *J. Mater. Sci.,* 11, 1019-1030 (1976).
4. A. J. Majumdar, R. W. Nurse, Glass Fiber Reinforced Cement, *Mat. Sci. Eng.,* 15, 107-127 (1974).
5. A. J. Majumdar, J. F. Ryder, Glass Fiber Reinforcement of Cement Products, *Glass Technol.,* 9[3], 78-84 (1968).
6. S. Z. Baxter, C. Meyer, W. Jin, Use of Waste Glass in Concrete, U.S. Pat. No. 5,810,921, issued Sep. 22, 1988 and assigned to the Trustees of Columbia University in the City of New York (USA).
7. C. D. Johnston, *Glass Fiber-Reinforced Cements and Concretes,* Chapter 6, edited by V. M. Malhotra, Gordon & Breach Science Publishers, 2001.
8. *Proceedings Durability of Glass Fiber Reinforced Concrete Symposium,* Nov. 12-15, 1985; Prestressed Concrete Institute, Chicago.
9. A. Bentur, M. Ben-Bassat, D. Schneider, Durability of Glass-Fiber-Reinforced Cements with Different Alkali-Resistant Glass Fibers, *J. Am. Ceram. Soc.,* 68[4] 203-208 (1985).
10. L. J. Lamer, K. Speakman, A. J. Majumdar, Chemical Interactions between Glass Fibers and Cement, *J. Non-Cryst. Solids,* 20, 43-74 (1976).
11. R. K. Brow, The Structure of Simple Phosphate Glasses, *J. Non-Cryst. Solids,* 263 & 264, 1-28 (2000).
12. M. G. Mesko, D. E. Day, Immobilization of Spent Nuclear Fuel in Iron Phosphate Glass, *J. Nuclear Mat.,* 273, 27-36 (1999).
13. D. E. Day, Z, Wu, C. S. Ray, P. Hrma, Chemically Durable Iron Phosphate Glass Wasteforms, *J. Non-Cryst. Solids,* 241, 1-12 (1998).
14. D. E. Day, "*Iron Phosphate Compositions for Containment of Hazardous Metal Waste,*" U.S. Pat. No. 5,750,824, May 12, 1996, assigned to the Curators of the University of Missouri.
15. S. T. Reis, M. Karabulut, D. E. Day, Chemical Durability and Structure of Zinc-Iron Phosphate Glasses, *J. Non-Cryst. Solids,* 292, 150-157 (2001).
16. M. Karabulut, E. Melnik, R. Stefan, G. K. Marasinghe, C. S. Ray, C. R. Kuriqian, D. E. Day, Mechanical and Structural Properties of Phosphate Glasses, *J. Non-Cryst. Solids,* 288, 8-17 (2001).
17. X. Fang, C. S. Ray, A. Mogus-Milankovic, D. E. Day, Iron Redox Equilibrium, Structure and Properties of Iron Phosphate Glasses, *J. Non-Cryst. Solids,* 283, 162-172 (2001).
18. G. K. Marasinghe, M. Karabulut, C. S. Ray, D. E. Day, M. G. Shumsky, W. B. Yelon, C. H. Booth, P. G. Allen, D. K. Shuh, Structural Features of Iron Phosphate Glasses, *J. Non-Cryst. Solids,* 222, 144-152 (1997).
19. B. C. Sales, M. M. Abrahm, Structural Properties of Lead-Iron Phosphate Glasses, *J. Non-Cryst. Solids,* 71, 103-112 (1985).
20. T. M. Neidt, Recycling of Industrial Phosphate Waste as Raw Material for Innovative Iron Phosphate Glass Fibers, Mo-Sci Corp. Final Report Phase I SBIR Contract No. 68-D-03-030, U.S. Environmental Protection Agency, Sep. 30, 2003.
21. T. P. Seward, *High Temperature Glass Melt Property Database for Modeling,* Technical/Scientific Report DE-FG07-96EE41262, Mar. 31, 2003; pp. 64; http://www.eere.energy.gov/industry/glass/pdfs/cgr_database.pdf
22. Cem-FIL® GRC Technical Data, Saint-Gobain/Vetrotex, http://www.cem-fil.com/pdf/Complete%20Manual2. pdf.
23. G. K. Marasinghe, M. Karabulut, C. S. Ray, D. E. Day, Properties and Structure of Vitrified Iron Phosphate Nuclear Wasteforms, *J. Non-Cryst. Solids,* 263&264, 146-154 (2000).
24. S. T. Reis, M. Karabulut, D. E. Day, "Chemical Durability and Structure of Zinc-Iron Phosphate Glasses", *J. Non-Cryst. Solids,* 292, 150-157 (2001).

What is claimed is:

1. A phosphate glass composition comprising at least one calcium source, at least one phosphate source, at least one iron source, and $Y_2O_3$, wherein said composition has an atomic ratio of Ca/P of about 0.04 to about 0.50, an atomic ratio of O/P of about 3.10 to about 3.55 and an atomic ratio of Fe/P of about 0.005 to about 0.42.

2. The phosphate glass composition of claim 1, wherein the phosphate glass is substantially resistant to degradation in an alkaline environment having pH in a range from about 10 to about 14.

3. The phosphate glass composition of claim 1, wherein the atomic ratio of Fe/P is about 0.01 to about 0.25.

4. The phosphate glass composition of claim 1, wherein the atomic ratio of Ca/P is about 0.04 to about 0.34.

5. The phosphate glass composition of claim 1, further comprising at least one additional oxide species selected from the group consisting of NiO, MgO, $Al_2O_3$, $B_2O_3$, $Cr_2O_3$, $La_2O_3$, $CeO_2$, $TiO_2$, $MnO_2$, $Cu_2O$, $Na_2O$, BaO, and combinations thereof.

6. The phosphate glass composition of claim 1, further comprising at least one additional rare earth oxide species selected from the group consisting of $La_2O_3$, CeO2, and combinations thereof.

7. The phosphate glass composition of claim 5, wherein the cumulative amount of said at least one additional oxide species is in a range from about 10.0 mol % to about 45.0 mol % based on the total number of moles in the composition.

8. The phosphate glass composition of claim 6, wherein the cumulative amount of said at least one rare earth oxide species is in a range from about 0.1 mol % to about 11.0 mol % based on the total number of moles in the composition.

9. The phosphate glass composition of claim 1, wherein said composition includes component limits selected from the group consisting of: about 12 mol % to about 16 mol % NiO; less than about 2 wt. % SrO; less than about 10 wt. % $SiO_2$; less than 2.5 mol % $ZrO_2$ and less than about 2 mol % alkali metal oxides.

10. The phosphate glass composition of claim 1, wherein said composition includes at least fluoride source selected from the group consisting of $CaF_2$, $MgF_2$, $BaF_2$, $SrF_2$, and $AlF_3$.

11. The phosphate glass composition of claim 1, further comprising a crystalline calcium phosphate layer on the surface of said phosphate glass composition.

12. A method of making a calcium-iron-phosphate (CFP) glass, said method comprising:
    combining and mixing at least one calcium source, a phosphate source, and an iron source, and $Y_2O_3$, to form a homogeneous CFP mixture;
    melting said CFP mixture to form a CFP glass composition,
    wherein an atomic ratio of Ca/P in the CFP glass composition is about 0.04 to about 0.50, an atomic ratio of O/P in the CFP glass composition is about 3.10 to about 3.55, and an atomic ratio of Fe/P in the CFP glass composition is about 0.005 to about 0.42.

13. The method of claim 12, wherein the CFP glass is substantially resistant to degradation in an alkaline environment having pH in a range from about 10 to about 14.

14. The method of claim 12, wherein the atomic ratio of Fe/P in the CFP glass composition is about 0.01 to about 0.25 and the atomic ratio of Ca/P in the CFP glass composition is about 0.04 to about 0.34.

15. The method of claim 12, wherein the CFP mixture further comprises at least one additional oxide species selected from the group consisting of NiO, MgO, $SiO_2$, $Al_2O_3$, $B_2O_3$, $Cr_2O_3$, $La_2O_3$, $CeO_2$, $TiO_2$, $MnO_2$, $Cu_2O$, $Na_2O$, BaO, and combinations thereof.

16. The method of claim 12, wherein the CFP mixture further comprises at least one additional rare earth oxide species selected from the group consisting of $La_2O_3$, $CeO_2$, and combinations thereof, and wherein the cumulative amount of said at least one rare earth oxide species is in a range from about 0.1 mol % to about 11.0 mol %, based on the total number of moles in the composition.

17. The method of claim 12, wherein the at least one calcium species comprises a species selected from the group consisting of $CaF_2$, CaO, a calcium-containing species that CaO may be derived from, and combinations thereof.

18. The method of claim 12, wherein the phosphate species comprises $P_2O_5$; a phosphate-containing species that $P_2O_5$ may be derived from; phosphate sludge from corrosion treatment of iron metals; calcium phosphate phosphor from fluorescent tubes; and combinations thereof 19. The method of claim 12, wherein the melting is carried out in a refractory crucible.

20. The method of claim 12, wherein the melting is carried out in air.

21. The method of claim 12, wherein the melting is carried out at temperature in a range from about 900° C. to about 1350° C.

22. The method of claim 12, wherein the calcium species comprises CaO and the phosphate species comprises $P_2O_5$, and wherein the cumulative amount of the CaO species and the $P_2O_5$ species in the CFP mixture is less than about 80 wt. %, based on the total weight of the components in the CFP mixture.

23. The method of claim 12, further comprising drawing the CFP glass composition to form CFP glass fibers.

24. The method of claim 23, wherein the CFP glass fibers have diameter in a range from about 1 µm to about 100 µm.

25. The method of claim 24, wherein the CFP glass fibers are drawn from a bushing made from a refractory, ceramic oxide.

26. A glass fiber reinforced concrete (GFRC) composition comprising cement and the calcium-iron-phosphate (CFP) glass of claim 1.

27. A polymeric composition comprising a polymer and the calcium-iron-phosphate (CFP) glass of claim 1, wherein the polymer comprises a species selected from the group consisting of plastic, rubber, thermoplastic resin, and thermoset resin.

28. A method for containment of hazardous waste in a rigid waste form comprising:
    heating a batch mixture comprising said waste and a matrix-forming component at a temperature not in excess of about 1200° C. to form a melt; and
    cooling said melt to form said rigid waste form having said metal waste chemically dissolved therein, said batch mixture having the compositional makeup of claim 1.

29. The method of claim 28 wherein the composition of said batch mixture and the rate of cooling of said melt are controlled such that said waste form is substantially vitreous.

30. A waste form prepared according to method 28.

* * * * *